Patented June 5, 1951

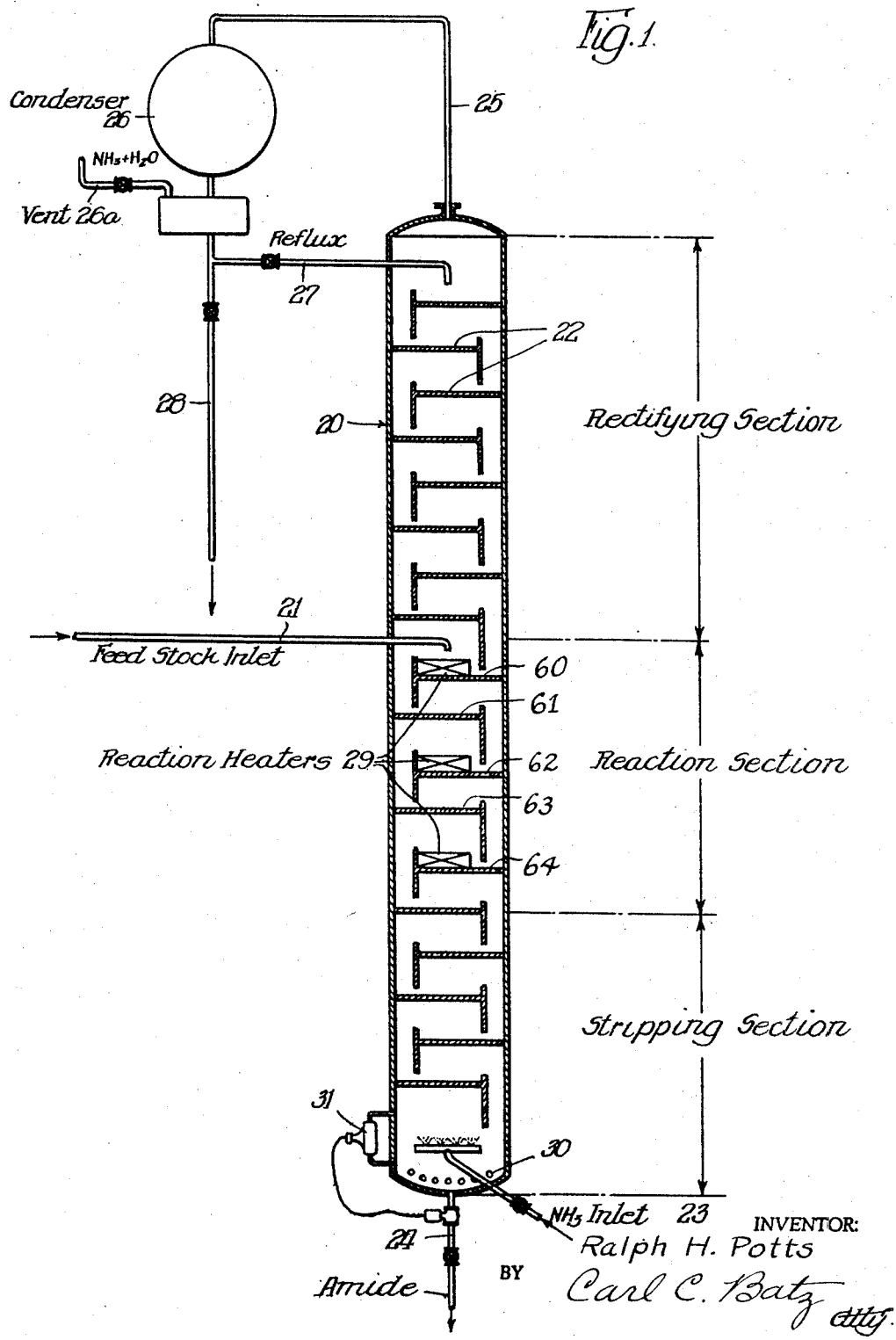

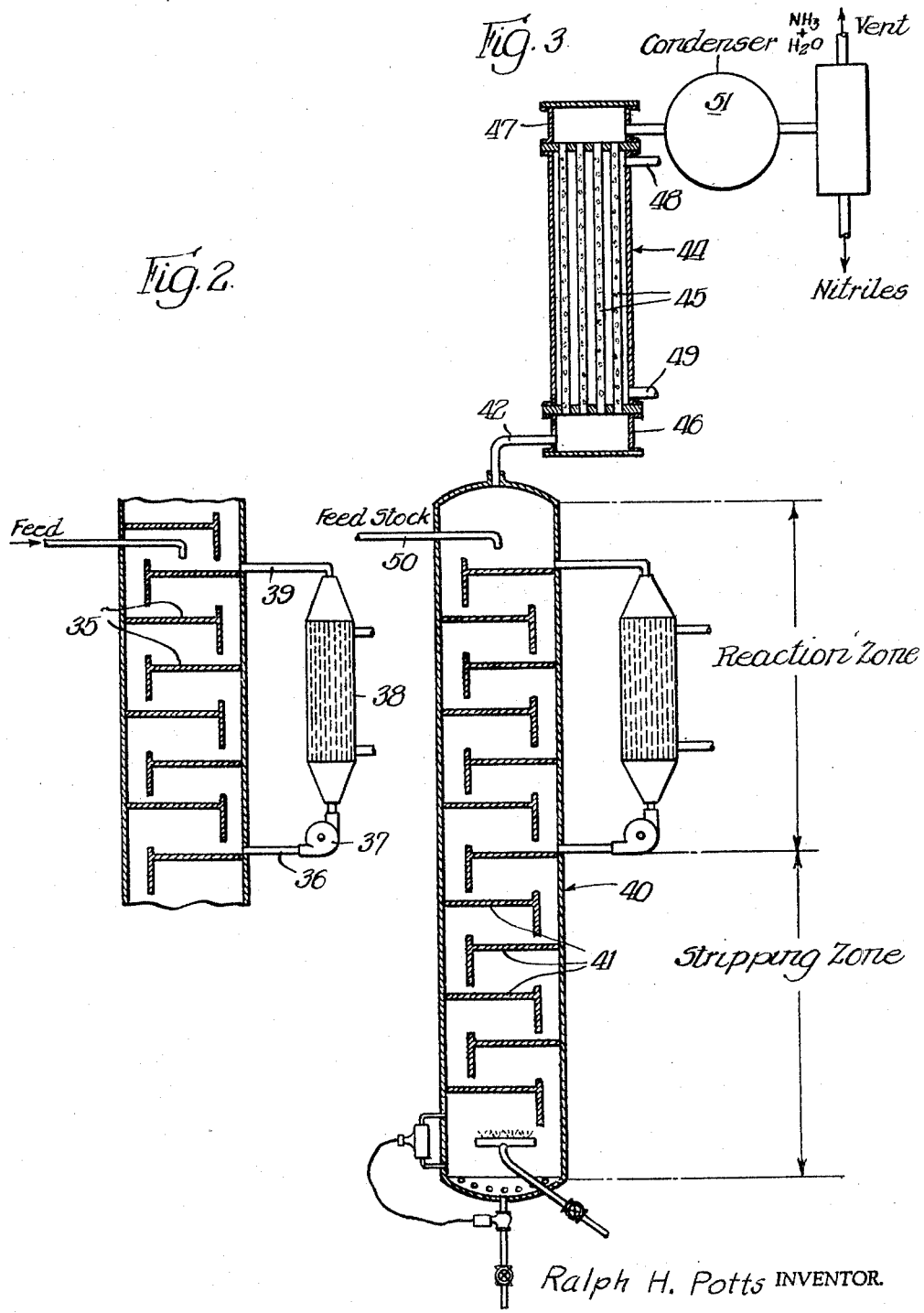

2,555,606

UNITED STATES PATENT OFFICE 2,555,606

MANUFACTURE OF NITRILES AND AMIDES

Ralph H. Potts, La Grange, Ill., assignor to Armour and Company, Chicago, Ill., a corporation of Illinois Application October 17, 1945, Serial No. 622,926

12 Claims. (Cl. 260—465.2)

This invention relates to the preparation of fatty acid nitriles and deals especially with continuous processes for preparing such nitriles.

The nitriles of the higher fatty acids, namely those fatty acids having eight or more carbon atoms, are substances of increasing technical importance. They are useful in the arts as such, and they can be readily hydrogenated to corresponding primary aliphatic amines.

An important object of the present invention is to provide simple and effective processes for conducting the reaction of fatty acids and ammonia to produce the corresponding nitriles. Another object is to provide such processes which may be easily and economically operated with a minimum of equipment to produce the desired products at a rapid rate. Another object is to provide processes which can be continuously operated and which will yield a high quality product in which the conversion to nitriles is substantially complete.

Another object is to provide a process for producing nitriles wherein the use of a catalyst and the equipment normally associated with the use of a catalyst is not necessary.

Still another object is to provide improved and simplified apparatus for carrying out the processes here involved.

Figure 1 of the accompanying drawing is a schematic diagram of one type of apparatus which may be used in carrying out the improved processes. It is understood, however, that widely differing types of equipment may be used in practicing the invention.

In the apparatus illustrated in Figure 1, the fatty acid feed enters a tower arrangement 20 by way of line 21. This tower is equipped with receptacles consisting of bubble trays and plates. Any suitable number of trays may be used and the tower may be of any suitable size and height. The tower can be looked upon as containing three general zones. That zone disposed at about the middle of the tower is the reaction zone wherein the primary reaction between ammonia and the fatty acid takes place. The upper section of the tower can be considered as the rectifying zone wherein nitriles are continuously separated from fatty acids, and the lower or stripping zone is the section where fatty acids are separated from amides. Ammonia enters the tower through line 23, amide may be withdrawn through line 24, and vapors leave the tower through line 25 to a condenser 26 wherein the nitrile product is condensed. Arrangement is made for the return of reflux, if desired, through line 27 connecting with nitrile outlet 28. As here shown the moisture and excess ammonia pass off through vent 26a to the atmosphere. If desired, provision can be made for recovering the excess ammonia for reuse in the process.

The middle section or reaction zone of the tower is heated with one or more heating coils schematically shown at 29. These heating coils are desirably heated with a fluid which is introduced in the vapor state but has a condensation temperature above the reaction temperature to be maintained in the reaction zone. Such a fluid may suitably be a mixture of diphenyl and diphenyl oxide. Other ways of heating the reaction zone can be used, for example, the heating coils 29 can contain steam as a heating fluid, or electrical heating elements can be employed.

The following detailed description of the operation of this arrangement illustrated will deal with the reaction of stearic acid for purposes of explanation, it being understood that other suitable stock may be used in place of this.

The liquid stearic acid after being passed through line 21 into the tower meets an upward current of ammonia, and here enters into reaction with ammonia. It is believed that the reaction involves first the formation of ammonium soaps ($RCOOH + NH_3 \rightarrow RCOONH_4$); the soaps then breaking down to form stearamide and water ($RCOONH_4 \rightarrow RCONH_2 + H_2O$); and the amide then breaking down to form nitrile and ammonia and fatty acid ($2RCONH_2 \rightarrow RCOOH + RCN + NH_3$). The nitriles boil at lower temperatures than the corresponding fatty acids and the fatty acids boil at lower temperatures than the corresponding amides.

The liquid acid which is passed through line 21 into the tower is discharged on the tray 60 into the liquid pool held on this tray. As it overflows tray 60, the stock falls to tray 61 into a second pool and thence to tray 62 into a third liquid pool, and so on through the reaction zone. Gaseous ammonia is continuously passing upwardly through the reaction zone and is caused to pass successively through the liquid pools on trays 64, 63, 62, 61, and 60. Contact of ammonia with liquid acid on tray 64 at the temperature maintained in the reaction zone results in reaction of ammonia and acid to produce nitriles which at this temperature vaporize and pass upwardly along with unreacted ammonia. Likewise in the pool on tray 63 further reaction of liquid acid and ammonia takes place to produce further nitriles which vaporize and also pass upwardly along with excess ammonia. Likewise in each of pools 62, 61 and 60 further reaction results in the production of further quantities of nitriles which vaporize after their formation. In this operation the vaporous nitriles formed as a result of the reaction in the lower pools of the series pass through each of the pools above and in doing so provide violent agitation of the material still in liquid phase and greatly increase dispersion of ammonia in the pools through which these vaporous nitriles pass, thus promoting better contact between the reactants in these higher pools.

The vaporous nitriles passing upwardly from tray 60 at the upper portion of the reaction section enter the rectifying section. Some fatty acids will unavoidably be entrained or vaporized and will pass upwardly along with the vaporous nitriles into the rectifying zone. In the rectifying zone are a second series of zones containing pools of liquid. As shown in Figure 1, reflux liquid in the form of condensed nitriles is introduced at the upper portion of the rectification zone. As the vapors from the reaction zone, including nitriles and some fatty acids, pass upwardly through the pools of liquid counter to the reflux nitriles, the fatty acids, being of higher boiling point than the nitriles, are selectively condensed, and the vapors reaching the top of the rectifying zone are substantially pure nitriles. The pools within this zone will be found to contain a successively larger proportion of nitriles and a smaller proportion of fatty acids toward the upper portion of the zone. Any acids which have been carried up from the reaction zone will be quickly condensed and returned to the reaction zone by the rectifying action. The nitriles proceeding toward the top of the zone finally pass off through line 25 in vaporous form. The vaporous nitriles, after being condensed by the condensing equipment 26, are recovered in part as a liquid nitrile product and in part returned through line 27 to the upper portion of the tower as reflux liquid.

As before stated, the reactions taking place at the reaction zone of the tower include the formation of amides, and not all of the amides immediately break down into nitriles, the ratio of amides, nitriles and fatty acids existing in the reaction zone depending in part on the temperature and the time in contact with the heat supply. The amides, being of higher boiling point than either the corresponding nitriles or fatty acids, will tend to move downwardly in the pools within the tower. The amides, however, are intermixed with unreacted fatty acids, nitriles and any other high boiling substances of the feed stock; and as this mixture, principally amides and fatty acids, moves into the pools within the stripping section against the upwardly moving current of ammonia, the fatty acids and any nitriles present are stripped from the amides. Also, any fatty acids and nitriles formed by further breakdown of the amides are carried upwardly in the same way. Thus the pools within the stripping section contain a successively larger proportion of amides and a smaller proportion of fatty acids toward the bottom of the section.

The amides collect in substantially pure form at the bottom of the tower and may be withdrawn either continuously or at intervals through the outlet 24. An automatic level regulating device 31 of any suitable type may be used to maintain a desired level of liquid amide at the bottom of the tower. A heat coil 30 is provided at the bottom of the tower for supplying heat to the stripping zone in addition to that furnished from the reaction zone where such additional heat is necessary to maintain the desired temperature. The temperature in the stripping zone need only be high enough to vaporize fatty acids in the presence of the introduced ammonia. The ammonia entering the bottom of the tower causes fatty acid to be vaporized at a lower temperature than would ordinarily happen if no ammonia were present. In the stripping zone of the tower the temperature, for stearic acid nitrile formation, is maintained at an average of about 300° C. which is high enough to cause the stearic acid to boil without vaporizing the stearamide. Under the conditions of the process, having regard for the introduction of ammonia and its tendency to lower the boiling points of the fatty acid materials in the tower, the stearic acid will boil at 297° C. whereas stearamide boils at 321° C.

Temperatures maintained within the tower are, of course, dependent upon the kind of fatty acid introduced. With stearic acid the reaction heaters 29 may be maintained at a temperature of about 300° C. This is below the boiling point of stearic acid at ordinary room pressure in the absence of any added ammonia. In view of the ammonia present, however, some of the stearic acid will vaporize before it has reacted with ammonia to form ammonium soaps as a first product. The upper section of the tower may be maintained at about 275° C. which is low enough to cause the stearic acid vapors in the rectifying zone to condense but is high enough to maintain the nitrile in the vapor state. Thus, there is a continuous rectification of the mixture of nitrile vapors and stearic acid vapors entering the rectifying zone and the stearic acid is pushed down from the rectifying zone into the reaction zone.

As above indicated, there will also be a temporary accumulation of stearic acid amide in the reaction zone. This amide, together with unreacted fatty acid flows downwardly into the stripping zone maintained at a temperature of about 300° C., for example. As before stated, under these conditions fatty acid accumulated in the stripping zone is pushed upward into the reaction zone leaving the stearamide behind. Thus, this process permits the continuous production of both nitriles and amides.

However, when nitrile only is the desired product then the outlet at the bottom of the tower can be closed. Amide collection in the stripping zone decomposes continuously to form nitrile and fatty acid in accordance with the equations before given, and both of these substances pass into the reaction zone, with the nitrile finally passing from the rectifying zone and out of the tower. In this case the tower acts as a nitrile production unit without the recovery of an amide product. The amide collects at the bottom of the tower where it is built up to such extent that its conversion into nitriles by decomposition is automatically accomplished.

It will be observed that when nitriles only are produced, the stripping zone serves no useful purpose; consequently where amides are not desired this section may be omitted.

The rectifying, reaction and stripping sections may of course take forms widely differing from that shown in Figure 1, and, if desired, these sections may be disposed in different enclosures or towers instead of in a single tower as shown.

A modified type of reaction section is illustrated schematically by Figure 2 of the drawings in which is contained the trays 35 which provide a series of intermediate zones comprising liquid pools. Liquid is withdrawn from the lower portion of the section through line 36 by the pump 37 and passed through the heater 38 and returned to the upper portion of the section through line 39. The heater may employ as a heating medium a mixture of diphenyl and diphenyl oxide which condenses at the temperature desired to be maintained. Of course other suitable heating means may be employed. In the operation of this modified arrangement the liquid within the reaction zone is passed downwardly in considerable volume due to the circulation here provided, and this enables very efficient contact between the liquid and the upwardly moving ammonia.

With other fatty acids the process may be the same, although the tower temperature conditions will vary to meet the requirements of any particular acid. These requirements are simply that the reaction zone be operated at a temperature such that nitriles are distilled from the reaction mixture, the stripping zone be operated at a temperature such that fatty acids are vaporized, in the presence of the added ammonia, and the rectifying zone be operated at such a temperature that fatty acid vapors are substantially condensed therein while at the same time delivering the nitriles in vaporous form.

The reaction taking place within the reaction zone is substantially in the liquid phase, although because of the presence of ammonia there will be some vaporization of fatty acid. The vaporized fatty acid, however, is condensed in the rectifying section and so returned in liquid phase for reaction with ammonia in the reaction zone.

It is essential that the ammonia passing into the reaction zone be in excess of the amount stoichiometrically required by theory for reaction with the feed stock being introduced. For good operation the amount of the ammonia should be at least two times the theoretically required amount, and preferably about five times the theoretically required amount.

A feed stock may be any higher fatty acid such as stearic, palmitic, oleic, linoleic, lauric, etc. or mixtures of such acids such as the natural fatty acid mixtures obtained upon hydrolysis of natural oils such as soyabean, cottonseed, tallow or fish oil. Also, I may use rosin acids such as the rosin acid contained in tall oil, or I may use the fatty acid mixture obtained from tall oil, or tall oil itself. However, it is preferable that the fatty acid-bearing constituents of the feed stock have a rather narrow range of boiling points so that the nitrile of one constituent will not be held with the fatty acid or amide of another constituent to an objectionable degree as the process goes forward.

I have found that a particularly suitable feed material is produced by hydrolizing some naturally occurring oil, such as soyabean oil or cottonseed oil, and then fractionating the acids so obtained according to the processes set forth in the Potts et al. Patent No. 2,224,984 to produce a fraction containing a high proportion of acids which boil within a narrow range.

While in the foregoing description and illustration the rectifying, reaction, and stripping sections employed have been, for clearness of understanding, set out as distinct and permanent sections, it must be understood that there may be considerable overlapping of the parts of the equipment which serve as such sections. For example, using one type of stock and one set of temperature conditions, the respective reactions, stripping, and rectifying functions may be taking place at certain positions within the tower, while with some other stock and using other conditions these functions and reactions may take place at other points. Thus, when I refer to a reaction section, for example, I mean to indicate the portion wherein the reaction takes place under the conditions of operation employed, and not necessarily a precise part of a tower.

Figure 3 of the drawings shows schematically a modified type of apparatus wherein the rectifying section employed in Figure 1 has been replaced by a catalyst chamber. As here shown, the tower 40 is provided with trays 41, similar to those in the apparatus previously described. Leading from the reaction section of the tower is a conduit 42 which connects with the catalyst chamber 44.

The catalyst chamber 44 here shown is formed of a plurality of tubes 45, the ends of which communicate with the heads 46 and 47. Held within these tubes is a suitable dehydrating catalyst such as alumina. For heating this catalyst chamber a suitable heating fluid such as a mixture of diphenyl and diphenyl oxide is introduced in a vaporous form into the space about the tubes through the inlet 48, and then withdrawn in liquid form through outlet 49. Other types of catalyst chambers may, of course, be used.

In the operation of this modified system, the fatty acid stock is introduced through pipe 50 into the tower 40 where it passes downwardly through the series of zones against an upwardly moving current of ammonia just as in the system shown in Figure 1. Here a substnatial reaction takes place between the acids and ammonia which yields a mixture including nitriles, amides, water and unreacted fatty acids. As heat is absorbed the water and nitriles are rapidly vaporized and passed out through the conduit 42, and since no substantial rectification takes place a certain amount of fatty acids and amides may also be carried along with the nitriles all in vaporous form. When this vaporous mixture enters the catalyst chamber 44 and comes into contact with the catalyst, and unreacted fatty acids and the amides are converted to nitriles. By means of the heating fluid the catalyst chamber is maintained at a suitable temperature for liquid phase reaction such as 600° F.

The temperature of the reaction zone at tower 40 should be above the boiling points of the nitriles under the pressure conditions employed, but should be below 700° F. and preferably below 60° F.

The nitrile vapors passing from chamber 44 are condensed by the nitrile condenser 51 and the moisture and excess ammonia pass off to the atmosphere. As in the first system described, suitable arrangement may be made for recovering the excess ammonia for re-use in the process.

Where amides are not desired as a by-product, the lower or stripping section of the tower serves no useful purpose and may be eliminated as mentioned in connection with the first described system.

This system illustrated in Figure 3 is not affected substantially by using a feed material which contains fatty acid radicals of a wide range of boiling points, and so may be preferred for some types of feed stock. For example, the modified system may be efficiently operated using the fatty acid mixtures obtained by the hydrolysis of any natural oil.

The foregoing detailed description has been given for purposes of explanation only and no unnecessary limitation should be understood therefrom it being understood that many changes may be made in the manner of carrying out the invention, all within the spirit of the invention.

This application is a continuation of my copending application, Serial No. 384,232, entitled "Manufacture of Nitriles, etc.".

I claim:

1. A continuous process for making fatty acid nitriles comprising passing liquid fatty acid having at least 8 carbon atoms through a reaction zone against a counter-moving stream of ammonia, the ammonia being passed through said zone at a rate which is in excess of the stoichiometric amount needed for the reaction of all acids being passed through the zone, recirculating liquid from an end portion of said zone toward which said acid is passed back to the portion of said zone from which said acid is passed whereby said acid is moved in volume against the counter-moving ammonia and conversion to nitriles takes place, maintaining said zone at a temperature sufficient for liquid phase reaction of said acid and ammonia to produce nitriles, and high enough to vaporize nitriles substantially as rapidly as formed, continuously vaporizing and removing nitriles from said reaction zone substantially as rapidly as formed and condensing the vaporized nitriles.

2. A process for making fatty acid nitriles, comprising passing liquid fatty acid having at least 8 carbon atoms through a reaction zone against a counter-current of ammonia, the ammonia being passed through said zone at a rate which is in excess of the stoichiometric amount needed for the reaction of all acids being passed through the zone, withdrawing liquid including a portion of said acid yet unreacted from the end portion of said zone toward which said acid moves, reheating the withdrawn liquid, introducing the reheated liquid again into said reaction zone at an end portion from which said liquid acid moves whereby said acid is moved in volume against the counter-moving ammonia and conversion to nitriles takes place, maintaining said zone at a temperature sufficient for liquid phase reaction of said acid and ammonia to produce nitriles, and high enough to vaporize nitriles substantially as rapidly as formed, continuously vaporizing and removing said nitriles from the reaction zone substantially as rapidly as formed, and condensing the vaporized nitriles.

3. In a continuous process for making fatty acid nitriles the steps of continuously passing liquid fatty acid having at least 8 carbon atoms downwardly successively through a series of liquid pools containing fatty acid and nitriles, continuously passing gaseous ammonia upwardly through said series of pools whereby said ammonia is brought into contact with fatty acid in each of the pools of said series, maintaining said pools at a temperature sufficient for liquid phase reaction of the acid and ammonia to produce nitriles, withdrawing liquid from the lower portion of said series of pools, reintroducing withdrawn liquid to an upper portion of said series of liquid pools whereby the liquid reintroduced is again passed downwardly through said series of pools and whereby the volume of acid being passed downwardly counter-current to said ammonia is increased in proportion to the acid introduced to the process.

4. In a process of the class set forth for reacting ammonia with high molecular weight fatty acids to form nitriles, the steps of passing fatty acids having at least eight carbon atoms in a restricted stream through a heating zone and thence into a reaction zone, introducing ammonia into said reaction zone, recycling fatty acids from said reaction zone and in a restricted stream into a heating zone and back to said reaction zone, thereby vaporizing the mixture in said reaction zone, and passing said vapors over a dehydrating catalyst.

5. In a process of the class set forth for reacting ammonia with high molecular weight fatty acids to form nitriles, the steps of passing fatty acids having at least eight carbon atoms in a restricted stream through a heating zone and thence into a reaction zone, introducing ammonia into said reaction zone, recycling heated fatty acids from said reaction zone and through said first mentioned heating zone and back to said reaction zone, thereby vaporizing a portion of the mixture in said reaction zone, and passing the evolved vapors over a dehydrating catalyst.

6. In a process of the class set forth for reacting ammonia with high molecular weight fatty acids to form nitriles, the steps of passing fatty acids having at least eight carbon atoms in a restricted stream through a heating zone and thence into a reaction zone comprising a series of liquid pools, passing ammonia upward through said pools and in contact with said acid, whereby there is a conversion of acids and ammonia into nitriles, recycling fatty acids from said reaction zone and in a restricted stream through a heating zone and thence back to said reaction zone, and passing vapors evolved in said reaction zone over a dehydrating catalyst.

7. In a process for making high molecular weight acid nitriles, the steps of continuously passing acid having at least eight carbon atoms in one direction successively through a vertical series of pools of liquid containing said acid and nitriles, said acid being selected from the class consisting of rosin acids and fatty acids, continuously passing gaseous ammonia through said series of pools in a countercurrent direction and into contact with said acid in each of the pools of said series, said ammonia being in excess of the amount stoichiometrically required for reaction with said acid, maintaining said pools at a temperature sufficient for liquid phase reaction of the acid and ammonia to produce nitriles, and continuously withdrawing unreacted acids from an intermediate pool in the lower portion of said series of pools and passing the same into a pool in the upper portion of said series.

8. In a process for making high molecular weight rosin acid nitriles, the steps of continuously passing rosin acid having at least eight carbon atoms in one direction successively through a vertical series of pools of liquid containing such rosin acids and nitriles, continuously passing gaseous ammonia through said series of pools in a counter direction and into contact with said acid in each of the pools of said series, said ammonia being in excess of the amount stoichiometrically required for reaction with said acid, maintaining said pools at a temperature sufficient for liquid phase reaction of the acid and ammonia to produce nitriles, and continuously withdrawing unreacted acid from an intermediate pool of said series in the lower portion of said series and introducing said withdrawn acid into a pool in the upper portion of said series of pools.

9. In a process for making fatty acid nitriles, the steps of passing fatty acid having at least eight carbon atoms through a series of liquid pools containing mixtures of fatty acid and nitriles, which mixtures contain decreasing proportions of nitriles and increasing proportions of fatty acid toward one end of said series of pools, passing gaseous ammonia through said series of liquid pools in a direction counter to the direction of said acid, said ammonia being introduced in quantity exceeding the amount stoichiometrically required for reaction with the acid being passed through said pools, maintaining said liquid pools at a temperature sufficient for liquid phase reaction of said acid and ammonia to produce nitriles and to vaporize nitriles substantially as rapidly as formed, withdrawing unreacted fatty acid from the end of said series of pools containing an increasing proportion of fatty acid, heating said withdrawn fatty acid, and introducing the same into a pool at the opposite end of said series of pools.

10. In a process for making high molecular weight fatty acid nitriles, the steps of continuously passing fatty acid having at least eight carbon atoms downwardly through a series of vertically-spaced liquid pools containing fatty acids, nitriles, and amides, continuously passing gaseous ammonia upwardly through said series of pools and into contact with fatty acid in each of the pools of said series, maintaining said pools at a temperature sufficiently high for liquid phase reaction of the fatty acid and ammonia to produce amides and to convert amides to nitriles, passing amides downwardly through a second series of pools, and withdrawing liquid from the lower portion of said first series of pools and introducing the same into the upper portion of said first series of pools.

11. In a process for making high molecular weight fatty acid nitriles, the steps of continuously passing fatty acid having at least eight carbon atoms downwardly through a series of vertically-spaced liquid pools containing fatty acids, nitriles, and amides, continuously passing gaseous ammonia upwardly through said series of pools and into contact with fatty acid in each of the pools of said series, maintaining said pools at a temperature sufficiently high for liquid phase reaction of the fatty acid and ammonia to produce amides and to convert amides to nitriles, passing amides downwardly through a second series of pools, withdrawing liquid from a pool in the lower portion of said first series of pools, heating the withdrawn liquid, and introducing the heated liquid into the upper portion of said first series of pools.

12. In a process for making high molecular weight fatty acid nitriles, the steps of passing fatty acid having at least eight carbon atoms downwardly through a series of vertically-spaced liquid pools containing fatty acids, nitriles, and amides, passing gaseous ammonia upwardly through said series of pools and into contact with fatty acid therein, said ammonia being in excess of the amount stoichiometrically required for reaction with said acid, maintaining said pools at a temperature sufficiently high for liquid phase reaction of the fatty acid and ammonia to produce amides and to convert amides to nitriles, whereby amides are passed downwardly into the lower pools of said series and nitriles are passed upwardly into the upper pools of said series, applying heat to the lower pools of said series to convert amides therein to nitriles, and passing the vapors from the uppermost of said pools over a dehydrating catalyst.

RALPH H. POTTS.

REFERENCES CITED

The following references are of record in the file of this patent:

UNITED STATES PATENTS

| Number | Name | Date |
|---|---|---|
| 1,925,198 | Melvill | Sept. 5, 1933 |
| 1,945,114 | Lachman | Jan. 30, 1934 |
| 2,004,799 | Richardson | June 11, 1935 |
| 2,023,337 | Nicodemus et al. | Dec. 3, 1935 |
| 2,061,314 | Ralston et al. | Nov. 17, 1936 |
| 2,229,219 | Oxley et al. | Jan. 21, 1941 |
| 2,248,109 | Morrison et al. | July 8, 1941 |
| 2,314,894 | Potts et al. | Mar. 30, 1943 |

OTHER REFERENCES

Hougen et al. Chem. Process Principles (Wiley, part 1, 1943) pp. 182–191.